US009581490B2

(12) United States Patent
Al-Walaie et al.

(10) Patent No.: US 9,581,490 B2
(45) Date of Patent: Feb. 28, 2017

(54) PIPELINE INTEGRITY MONITORING USING FIBER OPTICS

(71) Applicant: Saudi Arabian Oil Company, Dhahran (SA)

(72) Inventors: Soliman A. Al-Walaie, Dhahran (SA); Saleh M. Al-Saikhan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 201 days.

(21) Appl. No.: 14/255,343

(22) Filed: Apr. 17, 2014

(65) Prior Publication Data
US 2015/0300874 A1  Oct. 22, 2015

(51) Int. Cl.
*G01D 5/32* (2006.01)
*G01H 1/00* (2006.01)
*G01H 9/00* (2006.01)
*G01N 9/18* (2006.01)
*G01M 3/04* (2006.01)

(52) U.S. Cl.
CPC ............ *G01H 9/004* (2013.01); *G01M 3/047* (2013.01)

(58) Field of Classification Search
CPC ............... G01M 3/047; G01M 11/085; G01M 11/0257; G01H 9/004
USPC ...................... 73/655, 657; 356/32
See application file for complete search history.

(56) References Cited

U.S. PATENT DOCUMENTS 5,026,141 A  6/1991  Griffiths
5,308,162 A  5/1994  Amano et al.
6,618,153 B2  9/2003  Lin et al.
7,173,690 B2  2/2007  Haran
8,064,738 B2  11/2011  Zandiyeh et al.
(Continued)

FOREIGN PATENT DOCUMENTS

EP   1811694 A1   7/2007
GB   2436142 A  *  9/2007   ......... G01D 5/35303
(Continued)

OTHER PUBLICATIONS

Author: Kazuo Hotate, Title: Fiber distributed Brillouin sensing with optical correlation domain techniques, Date: Sep. 16, 2013, Publisher/Publication: Elsevier Inc., Optical Fiber Technology 19, pp. 700-719.*

(Continued)

*Primary Examiner* — Lisa Caputo
*Assistant Examiner* — Roger Hernandez-Prewit
(74) *Attorney, Agent, or Firm* — Fish & Richardson P.C.

(57) ABSTRACT

In some examples of monitoring pipeline integrity using fiber optics, a first set of values that represent an attenuation of a light signal transmitted through an optical fiber positioned adjacent a pipeline to carry fluids and a second set of values that represent a dispersion of the light signal transmitted through the optical fiber are received. An attenuation profile of the light signal and a dispersion profile of the light signal through the optical fiber are generated based on the first and second sets of values, respectively. Using the profiles, a light-based profile signature describing an environment surrounding the optical fiber is generated, and compared with a baseline light-based profile signature describing an environment surrounding the optical fiber under a normal operating condition. A notification describing an operation of the pipeline is provided in response to the comparing.

18 Claims, 6 Drawing Sheets
(2 of 6 Drawing Sheet(s) Filed in Color)

(56) References Cited

U.S. PATENT DOCUMENTS

| | | | | |
|---|---|---|---|---|
| 2009/0132183 A1* | 5/2009 | Hartog | ............... | G01D 5/35303 |
| | | | | 702/42 |
| 2011/0188344 A1* | 8/2011 | Hartog | ................... | E21B 43/26 |
| | | | | 367/27 |
| 2011/0216996 A1 | 9/2011 | Rogers | | |

FOREIGN PATENT DOCUMENTS

| | | | | |
|---|---|---|---|---|
| WO | WO 2007073114 A1 * | 6/2007 | ............. | G01B 11/18 |
| WO | WO2007073114 A1 | 6/2007 | | |
| WO | WO 2012135103 A2 * | 10/2012 | ............. | G01R 31/11 |
| WO | WO2012135103 A2 | 10/2012 | | |

OTHER PUBLICATIONS

International Search Report and Written Opinion issued in International Application No. PCT/US2015/025402 on Sep. 11, 2015; 11 pages.
Frings, "Enhanced Pipeline Monitoring with Fiber Optic Sensors", 6th Pipeline Technology Conference, Published in 2011, 12 pages.
Inaudi et al., "Pipeline Leakage Detection and Localization Using Distributed Fiber Optic Sensing", Rio Pipeline, Copyright 2007, 8 pages.
Nikles et al., "Leakage Detection Using Fiber Optics Distributed Temperature Monitoring", SPIE Proceedings, vol. 5384, Jul. 27, 2004, 7 pages.
PCSC, "PipeSafe™ Fiber Optic Pipeline Monitoring System", Published on or before 2011, 2 pages.
Inaudi et al., "Long-Range Pipeline Monitoring by Distributed Fiber Optic Sensing", Journal of Pressure Vessel Technology, vol. 132, Feb. 2010, 9 pages.

* cited by examiner

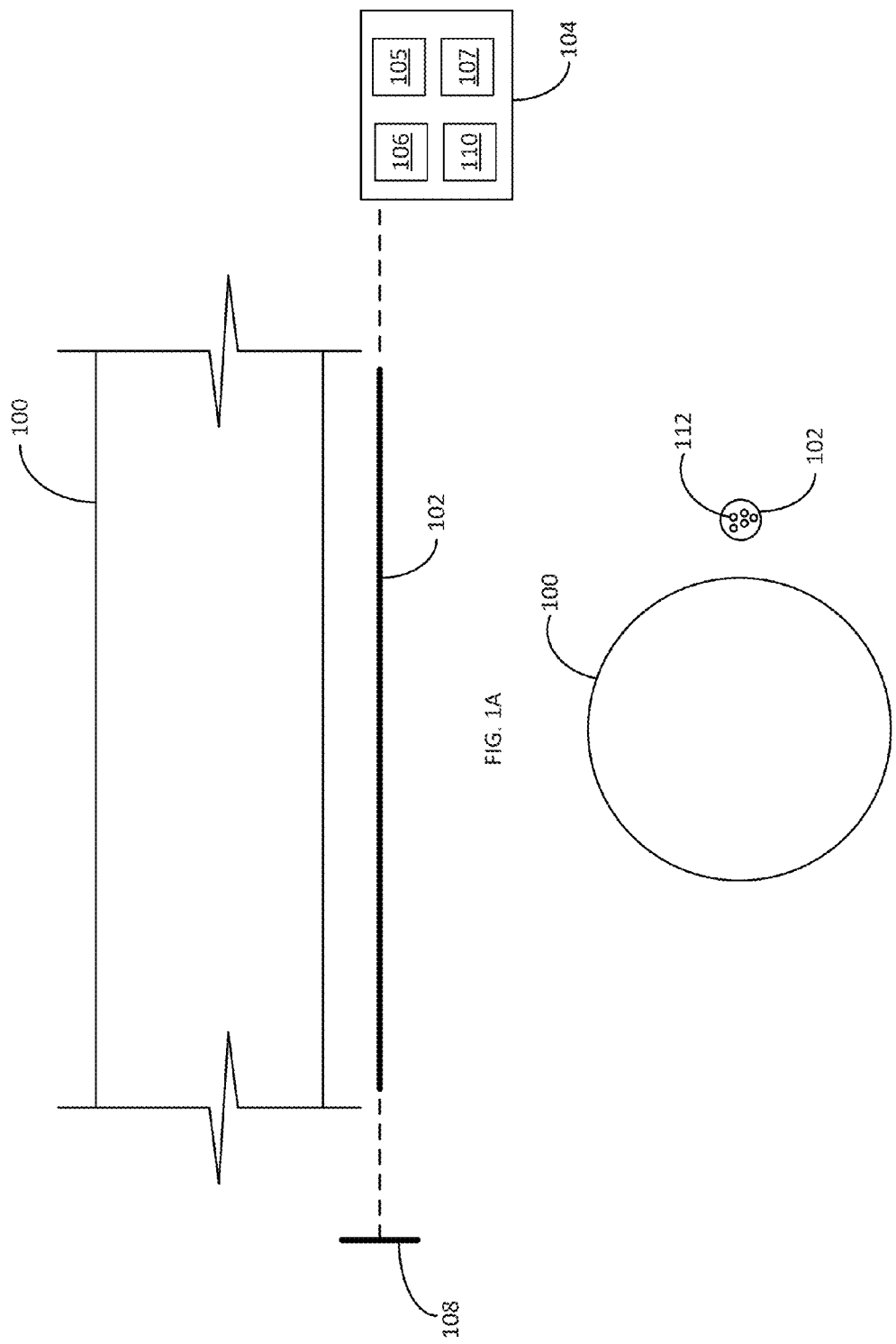

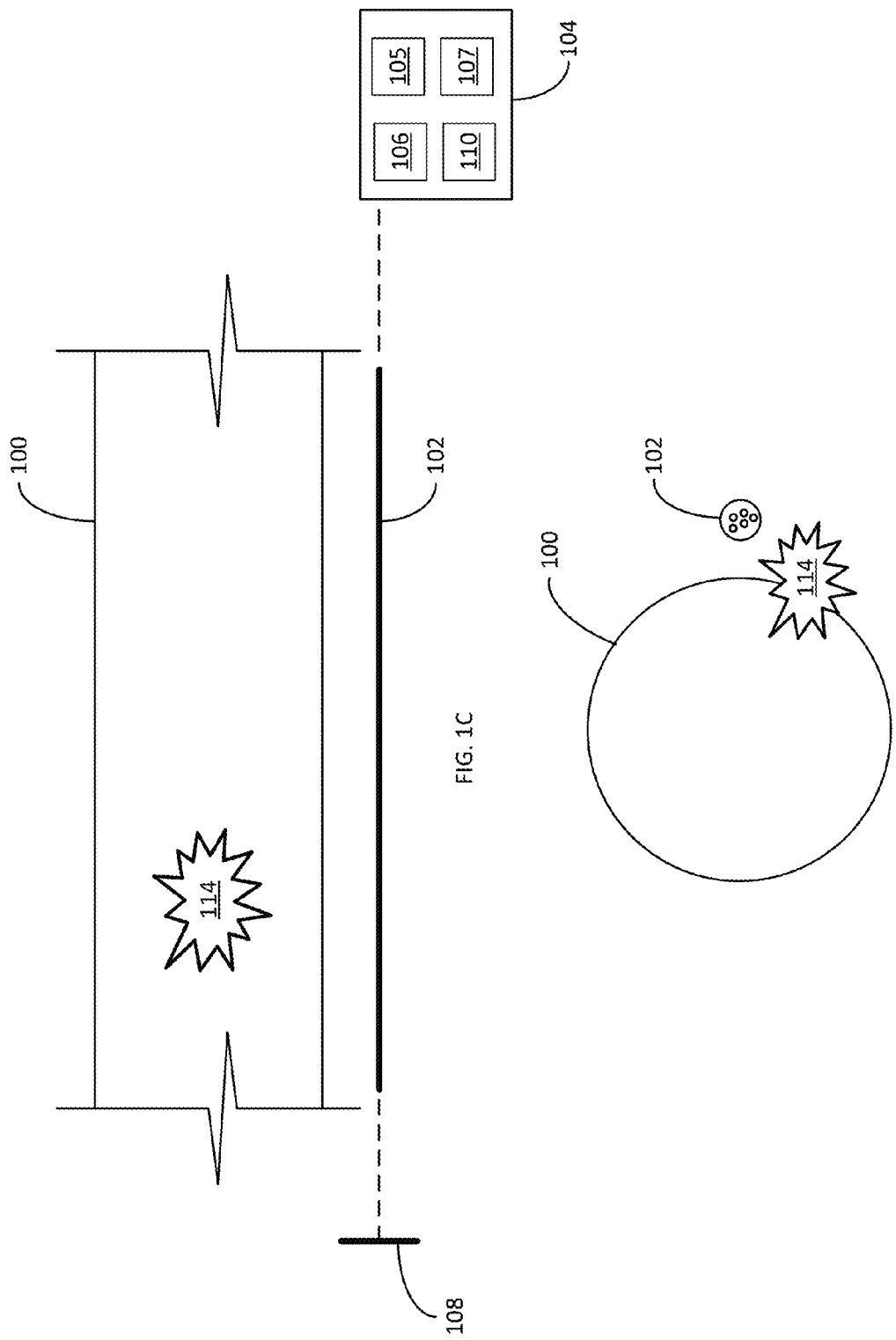

PIPELINE INTEGRITY MONITORING USING FIBER OPTICS

TECHNICAL FIELD

This disclosure relates to monitoring pipelines through which fluids, e.g., oil, gas, water, or other fluids, are flowed.

BACKGROUND

Pipelines, e.g., underground pipelines or other pipelines, are often used to transport fluids, e.g., oil, gas, water or other fluids, between locations. A pipeline failure, e.g., due to pipeline fracture or other reason, can result not only in loss of the fluids being flowed through the pipeline but also in damage to the environment in which the pipeline is positioned. Consequently, monitoring the integrity, e.g., structural integrity of pipelines is important.

SUMMARY

This disclosure describes pipeline integrity monitoring using fiber optics.

Certain aspects of the subject matter described here can be implemented as a method for monitoring a pipeline. The method is implemented using processing circuitry. A first set of values and a second set of values are received. The first set of values represents an attenuation of a light signal transmitted through an optical fiber positioned adjacent a pipeline to carry fluids. The second set of values represents a dispersion of the light signal transmitted through the optical fiber. An attenuation profile of the light signal through the optical fiber is generated based on the first set of values. A dispersion profile of the light signal through the optical fiber is generated based on the second a set of values. Using the attenuation profile and the dispersion profile, a light-based profile signature describing an environment surrounding the optical fiber is generated. The light-based profile signature describing the environment surrounding the optical fiber is compared with a baseline light-based profile signature describing an environment surrounding the optical fiber under a normal operating condition. A notification describing an operation of the pipeline is provided in response to comparing the light-based profile signature and the baseline light-based profile signature.

This, and other aspects, can include one or more of the following features. The attenuation profile and the dispersion profile are affected, in part, by an environment surrounding the optical fiber at a time of receiving the first set of values and the second set of values, respectively. It can be determined that the light-based profile signature substantially matches the baseline light-based profile signature. In that instance, the notification can identify the operation of the pipeline as being normal. It can be determined that the light-based profile signature substantially differs from the baseline light-based profile signature. In that instance, the notification can identify a failure in the operation of the pipeline. A location of failure on the pipeline can be determined based on comparing the light-based profile signature and the baseline light-based profile signature. To generate the attenuation profile of the light signal, a three-dimensional plot of light signal attenuation can be generated. The three-dimensional plot can include distance from a source of the light signal, light signal attenuation, and time of measurement on three axes of the three-dimensional plot. To generate the dispersion profile of the light signal, a three-dimensional plot of light signal dispersion can be generated. The three-dimensional plot can include wavelength of the light signal, dispersion, and time of measurement on three axes of the three-dimensional plot. To generate a light-based profile signature describing an environment surrounding the optical fiber using the attenuation profile and the dispersion profile, the attenuation profile and the dispersion profile can be correlated. The light-based profile signature can represent at least one of temperature or stress surrounding the optical fiber at a time of generation. The baseline light-based profile signature can represent at least one of temperature or stress surrounding the optical fiber during normal pipeline operation. A light source can be operated to transmit the light signal through the optical fiber. Backscattered light can be received in response to transmitting the light signal. The first set of values representing the attenuation of the light signal and the second set of values representing the dispersion of the light signal can be based, in part, on the backscattered light. At least one of the attenuation profile, the dispersion profile, or the light-based profile signature can be stored. The baseline light-based profile signature can be generated during a normal operation of the pipeline.

Certain aspects of the subject matter described here can be implemented as a system for monitoring a pipeline. The system includes a light source to transmit a light signal through an optical fiber positioned adjacent a pipeline to carry fluids. The system includes a receiver to receive backscattered light in response to transmitting the light signal. The system includes processing circuitry connected to the light source and the receiver the processing circuitry to perform operations described here.

Certain aspects of the subject matter described here can be implemented as a system for monitoring a pipeline. The system includes a light source to transmit a light signal through an optical fiber positioned adjacent a pipeline to carry fluids. The system includes a receiver to receive backscattered light in response to transmitting the light signal. The system includes processing circuitry connected to the light source and the receiver. The processing circuitry is configured to generate and attenuation profile of the light signal through the optical fiber and a dispersion profile of the light signal through the optical fiber based, in part, on the backscattered light. The processing circuitry is configured to compare a light-based profile signature describing the environment surrounding the optical fiber with a baseline light-based profile signature describing an environment surrounding the optical fiber under a normal operating condition. The light-based profile signature is generated based, in part, on the attenuation profile and the dispersion profile. The processing circuitry is configured to provide a notification describing an operation of the pipeline in response to comparing the light-based profile signature and the baseline light-based profile signature.

This, and other aspects, can include one or more of the following features. Providing the notification can include providing a notification of a change in an environmental condition surrounding the optical fiber. The environmental condition can include at least one of a temperature or a stress. The processing circuitry can be configured to determine a location of the change in the environmental condition surrounding the optical fiber using the attenuation profile and the dispersion profile.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee FIGS. 1A and 1B are schematic diagrams of an elevation view and a side view, respectively, of an example of a monitoring system monitoring an example of a pipeline under normal operation.

FIGS. 1C and 1D are schematic diagrams of an elevation view and a side view, respectively, of the monitoring system monitoring the pipeline experiencing instability.

Like reference numbers and designations in the various drawings indicate like elements.

DETAILED DESCRIPTION

Figure 2:
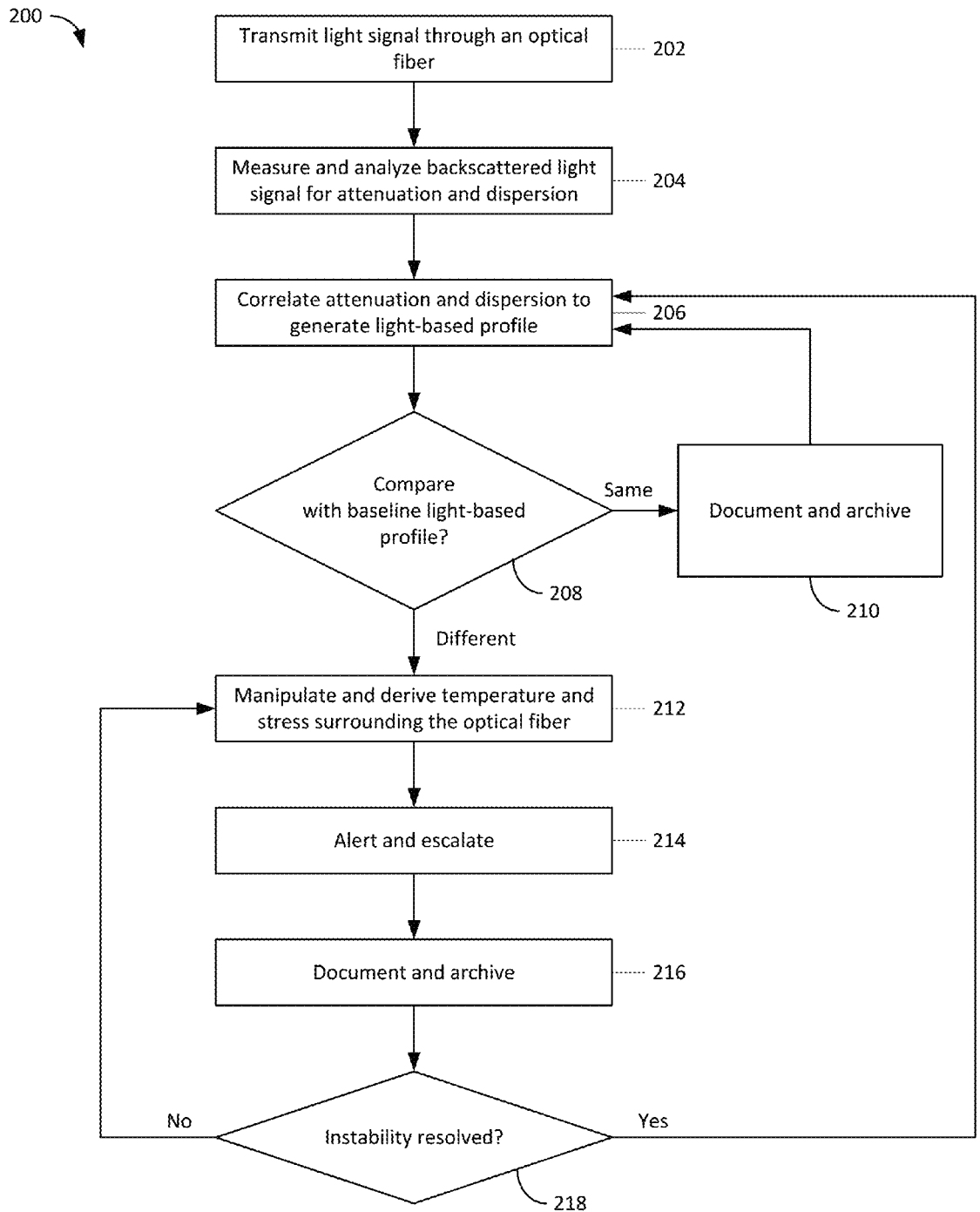
FIG. 2 is a flowchart of an example of a process for monitoring the pipeline.

This disclosure describes systems for pipeline integrity monitoring using fiber optics. Traditional pipeline integrity monitoring systems, e.g., large diameter splicing (LDS) systems, sometimes use several measurement points. Such systems can be limited in distance, can be independent standalone systems, and may not precisely locate pipeline instability. The systems described here can be implemented as alternatives to such traditional pipeline integrity monitoring systems. In some implementations, the systems described here can be implemented to measure, analyze, and correlate light signal dispersion and attenuation profiles of light signals transmitted through an optical fiber that runs adjacent to the pipeline. The system can measure and correlate stress or leak along a pipeline using changes in the light signal parameters, e.g., polarization mode dispersion (PMD), differential group delay (DGD), attenuation, chromatic dispersion (CD), other light signal parameters, or combinations of them. Attenuation and dispersion (e.g., PMD, DGD, CD or other dispersion) can be sensitive to environmental factors as well as any bend or stress in an optical fiber. PMD/DGD can be measured per wavelength or group or rays. The measurement can act as a real-time X-ray along the optical fiber by identifying different profiles.

The optical fibers implemented in the systems described here can be standalone systems or included in the fiber-optic cables that are usually installed along pipelines, e.g., to provide network connectivity. For example, a fiber-optic cable with 24 optical fiber strands can be installed adjacent to a pipeline to connect to different facilities, e.g., a refinery with a bulk plant or a refinery with another refinery, or to other facilities. One or more of the 24 optical fiber strands in the fiber-optic cable can be implemented to carry the light signal based on which the pipeline integrity can be monitored. Communication apparatus, e.g., switches, multiplexers, or other communication apparatus, can be connected to one end of such a fiber optic cable. The network connectivity provided by the fiber optic cable can be leveraged to transmit signals representing the backscattered light to the monitoring system or to other recipient systems.

In some implementations, a monitoring system can be connected to a light source to transmit a light signal to an end of the optical fiber. The light signal transmitted through the optical fiber experiences back scattering/reflection. The monitoring system can measure the reflected and/or transmitted signal, e.g., attenuation (i.e., weakness in the light signal as it travels across the fiber), polarization mode dispersion (or dispersion in general), or other parameters of the reflected and/or transmitted signal. For example, the monitoring system can include an optical time domain reflectometer (OTDR) to develop attenuation and/or dispersion profiles, and a computer system that can correlate the attenuation profile with the polarization mode dispersion profile to generate a signature image, e.g., a heat map. The monitoring system can create and store such a baseline signature image during a normal operation of the pipeline. Because the optical fiber is sensitive to changes in the environment (e.g., due to temperature, stress, combinations of them, or other changes) in which the optical fiber is positioned, the monitoring system can detect an effect of the changes on the light signal, and generate an operational signature image. The monitoring system can compare the operational signature image with the baseline signature image to determine a presence of a fracture in the pipeline and to determine a location of the fracture. In this manner, the monitoring system can use profile changes of fiber-optic operational coefficients to identify and precisely locate instabilities, fractures, leaks, or combinations of them in the pipeline. In addition, the monitoring system can approximate the volume of leaked product (e.g., oil, gas, water, combinations of them, or other product) based on the profile signature change and duration of the change.

By implementing the monitoring system described here, pipeline integrity can be monitored online and in real-time using communications fiber optics, e.g., by correlating light signal dispersion and attenuation profiles of light signals carried by the fiber optics. Implementations of the subject matter described here can increase and/or improve pipeline reliability and/or optimize operational performance. Implementations can also enhance operational safety and protect the environment. The monitoring systems can be implemented to proactively monitor and prevent pipeline failure, provide early detection of pipeline leaks, identify exact locations of pipeline leaks thereby helping to undertake repair activities in a timely manner, decrease operational and maintenance cost by increasing operational safety and environmental protection, or combinations of them. The monitoring systems can be implemented using as few as one optical fiber connected to a fiber-optic signal analyzer (time and frequency domain). The optical fiber can span an entire length of the pipeline which can be as long as 100 km or more. A standalone optical fiber can be dedicated for the analysis and profiling process while another optical fiber can be used to correlate time and frequency profiles, trend and archive data, and provide early warning for pipeline abnormalities. The optical fiber through which the light signal is carried need not be clamped with the pipeline or require any special arrangement to run adjacent the pipeline.

FIGS. 1A and 1B are schematic diagrams of an elevation view and a side view, respectively, of an example of a monitoring system monitoring an example of a pipeline under normal operation. In some implementations, a pipeline 100 to carry fluids (e.g., oil, gas, water, or other fluids) is positioned, e.g., underground or above the ground, between two facilities. A fiber optic cable 102 is positioned outside of and adjacent to the pipeline 100. In some implementations, the fiber optic cable 102 spans almost an entire length of the pipeline 100. The fiber optic cable 102 can be positioned at a distance from an outer surface of the pipeline 100 such that the fiber optic cable 102 experiences a physical effect as a result of changes to the pipeline 100. For example, a zone of influence surrounding the pipeline 100 can be defined. Changes to the pipeline 100, e.g., temperature changes, fractures, stress, instabilities, or other changes, can be felt within the defined zone of influence. A diameter of the zone of influence can be greater than a diameter of the pipeline 100 at any given cross-section of the pipeline 100. The fiber optic cable 102 can run alongside the pipeline 100 within the zone of influence.

At one end, the fiber optic cable 102 can be connected to a monitoring system 104 to monitor integrity of the pipeline 100. The monitoring system 104 can include or be connected to a light source 105 to transmit a light signal to an optical fiber 112 included in the fiber optic cable 102. At the other end, the fiber optic cable 102 can be connected to a reflector 108 to reflect the light signal back to the monitoring system 104. The monitoring system 104 can include a receiver 106 to receive backscattered light in response to transmitting the light signal through the optical fiber 112. The monitoring system 104 can include processing circuitry 110 connected to the light source 105 and the receiver 106. The processing circuitry 110 can analyze the backscattered light to evaluate and integrity of the pipeline 100. For example, the monitoring system 104 can include a light signal analyzer which implements the processing circuitry 110. The monitoring system 104 can alternatively or in addition include communication apparatus, e.g., switches, multiplexers, extenders, or other communication apparatus, to transmit and receive light signals.

In some implementations, the processing circuitry 110 can determine a first set of values and a second set of values based on the backscattered light. The first set of values represents and attenuation of the light signal transmitted through the optical fiber 112. The second set of values represents a dispersion of the light signal transmitted through the optical fiber 112. The processing circuitry 110 can generate an attenuation profile of the light signal through the optical fiber 112 based on the first set of values. The processing circuitry 110 can also generate a dispersion profile of the light signal through the optical fiber 112 based on the second set of values. Using the attenuation profile and the dispersion profile, the processing circuitry 110 can generate a light-based profile signature describing an environment surrounding the optical fiber 112. Because the pipeline 100 is operating under normal conditions, the light-based profile signature can represent a baseline profile signature. That is, the baseline profile signature can indicate an expected operation of the pipeline 100 under normal operating conditions. In other words, significant deviations of a light-based profile signature from the baseline profile signature can indicate instability or a fracture or a leak in the pipeline 100.

In some implementations, the processing circuitry 110 can develop the baseline profile signature for an interval of time, e.g., a year. During the year, the environment in which the pipeline 100 is positioned can vary. For example, the pipeline 100 can experience higher temperatures in summer relative to winter. The pipeline 100 can experience rain or snow during certain times of the year. The varying environment in which the pipeline 100 is positioned can cause corresponding variations in the attenuation profiles and the dispersion profiles at respective time instants during the interval of time. The processing circuitry 110 can determine multiple first and second sets of values based on the backscattered light, each set obtained at respective time instants during the interval. Based on the multiple first and second sets of values, the processing circuitry 110 can develop the baseline profile signature for the interval of time.

The monitoring system 104 can include a computer-readable storage medium 107 which can store the baseline profile signature for the interval of time. The computer-readable storage medium 107 can, alternatively or in addition, store the attenuation profiles and the dispersion profiles. As described above, the attenuation profile and the dispersion profile of the light signal are affected, in part, by an environment surrounding the optical fiber 112 at a time of receiving the first set of values and the second set of values, respectively. For example, the computer-readable storage medium 107 can store multiple time instants, and store a baseline profile signature determined for each time instant. The processing circuitry 110 can generate, e.g., in real-time, profile signatures based on the backscattered light signal as described above. The processing circuitry 110 can compare a real-time profile signature generated at a time instant with a baseline profile signature previously generated at a corresponding time instant. If a deviation between the real-time profile signature and the baseline profile signature generated at a corresponding time instant is not significant, then it can be concluded that the pipeline 100 is operating normally.

In some implementations, the processing circuitry 110 can correlate the baseline profile signatures with operational and/or environmental parameters of the pipeline 100, instead of or in addition to correlating based on time instants. For example, the processing circuitry 110 can correlate time and frequency profiles, and responsively determine a profile signature at a time instant that is based on the correlated time and frequency profiles. The processing circuitry 110 can be connected to one or more sensors (not shown) to receive signals indicating operational parameters (e.g., pipeline pressure, pipeline temperature, or other operational parameters) of the pipeline 100, signals indicating fluid parameters (e.g., fluid pressure, fluid temperature, fluid flow rate, or other fluid parameters), environmental parameters (e.g., surface temperature and/or pressure, underground temperature and/or pressure, or other environmental parameters), or combinations of them. The processing circuitry 110 can determine a baseline profile signature for a corresponding combination of operational parameters, fluid parameters, environmental parameters and time instant. When developing a real-time profile signature, the processing circuitry 110 can identify a corresponding combination of operational parameters, fluid parameters, and environmental parameters at a time instant. It can be concluded that the pipeline 100 is operating normally, when the processing circuitry 110 determines that a deviation between the real-time profile signature developed for a combination of parameters at the time instant is below a preset threshold relative to a baseline profile signature developed for the same or substantially similar combination of parameters at a corresponding time instant. An operator of the monitoring system can change the baseline profile signatures to account for different mappings and comparisons. For example, if there is excavation activity around the pipeline, then the operator can modify the baseline profile signatures to account for the time-frequency profile that will be present during such excavation activity. In addition, the processing circuitry 110 can approximate the volume of leaked product (e.g., oil, gas, water, combinations of them, or other product) based on the profile signature change and duration of the change.

FIGS. 1C and 1D are schematic diagrams of an elevation view and a side view, respectively, of the monitoring system 104 monitoring the pipeline 100 experiencing instability. As shown in FIGS. 1C and 1D, the pipeline 100 has experienced an instability 114 (e.g., a fracture, a leak, or other instability). An effect of the instability 114 extends to the zone of influence surrounding the pipeline 100 in which the fiber optic cable 102 which includes the optical fiber 112 is positioned. For example, a fluid leaking from the pipeline 100 can contact the optical fiber. Alternatively, or in addition, a temperature of the earth near a location of the instability 114 can change (e.g., increase or decrease). Because the optical fiber 112 is located near the location of the instability 114, the temperature of the optical fiber 112 can also change.

The light signal carried by the optical fiber 112 can be modulated due to the effect of the instability 114 on the optical fiber 112 resulting in a change in the attenuation profile and the dispersion profile. For example, changes in temperature, stress, vibration (or other changes) can impact DGD profiles which result in changing the overall PMD value, while attenuation profile is impacted by stress. In this situation, the light-based profile signature developed by the processing circuitry 110 will account for the effect of the instability 114 on the optical fiber 114. For example, a correlation between DGD/PMD and attenuation profiles can provide a nature and profile of the instability 114. The processing circuitry 110 can compare the light-based profile signature describing the environment surrounding the optical fiber 112 with the baseline light-based profile signature describing an environment surrounding the optical fiber 112 under a normal operating condition. In response to comparing the light-based profile signature and the baseline light-based profile signature, the processing circuitry 110 can provide a notification describing an operation of the pipeline 100. In this manner, the monitoring system 104 can monitor the pipeline 100. For example, the processing circuitry 110 can determine that the light-based profile signature substantially differs from the baseline light-based profile signature. In response, the processing circuitry 110 can transmit a notification indicating a failure in the operation of the pipeline 100.

In some implementations, the processing circuitry 110 can analyze a quantity of power of the light signal transmitted, a quantity of the power of the backscattered and transmitted light signal, and correlate the power profile/power figure to determine the instability 114, e.g., a stress at a section of the pipeline 100 or a discontinuity at another section of the pipeline 100 or combinations of them. In some implementations, the processing circuitry 110 can determine a location of the instability 114 on the pipeline 100 based on comparing the light-based profile signature and the baseline light-based profile signature. For example, the processing circuitry 110 can measure the location of the instability 114 from stress points along the optical fiber 112 through the polarization sensitive optical time-domain reflectometry (p-OTDR) using the speed of light and the time taken to receive the light signal.

FIG. 2 is a flowchart of an example of a process 200 for monitoring the pipeline 100. In some implementations, the process 200 can be implemented by components of the monitoring system 104, e.g., the processing circuitry 110. Alternatively or in addition, the process 200 can be implemented by data processing apparatus (not shown) included in the monitoring system 104. The data processing apparatus (e.g., one or more processors) can execute computer instructions stored, e.g., on the computer-readable storage medium 107, to perform the operations of process 200.

At 200, a light signal is transmitted through an optical fiber. For example, the processing circuitry 110 can provide a control signal to the light source 105 to transmit a light signal through the optical fiber 112. The light signal can be reflected by the reflector 108 through the optical fiber 112. The monitoring system 104 can receive the backscattered light signal.

Figure 3:
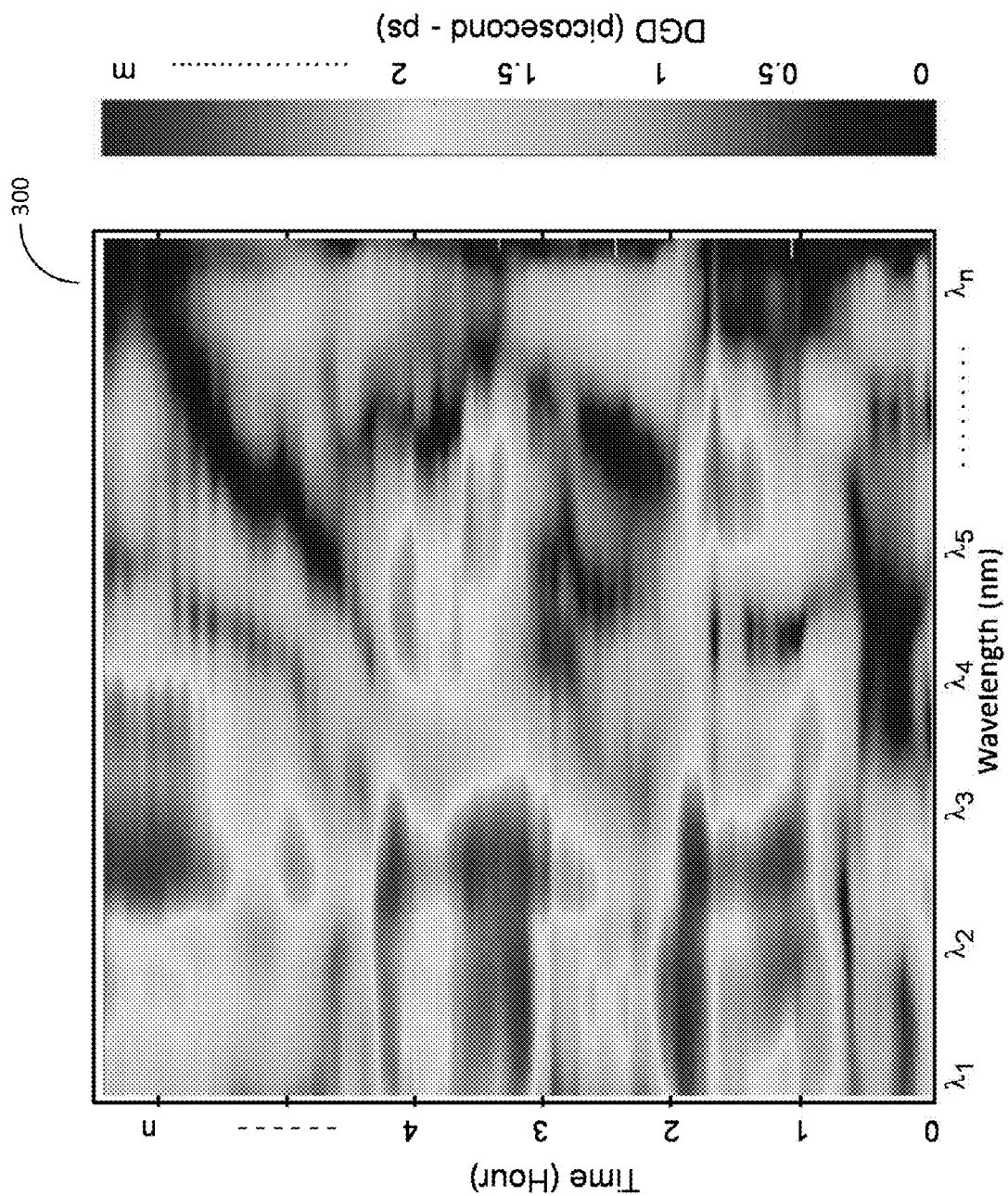
FIG. 3 is an example of a signature image showing a dispersion profile determined by the monitoring system.
Figure 4A:
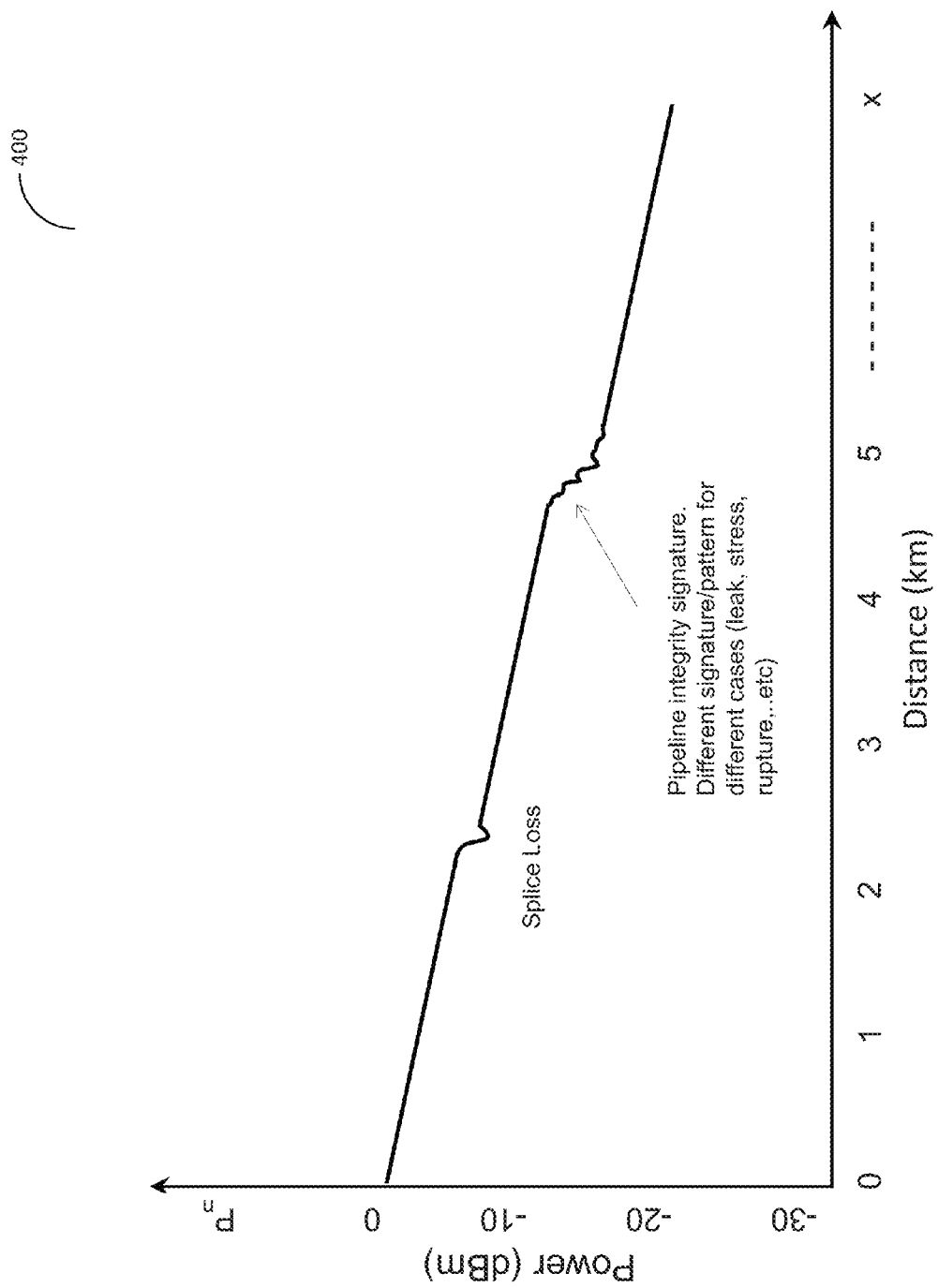
FIG. 4A is an example of an attenuation profile experienced by a light signal transmitted through an optical fiber.
Figure 4B:
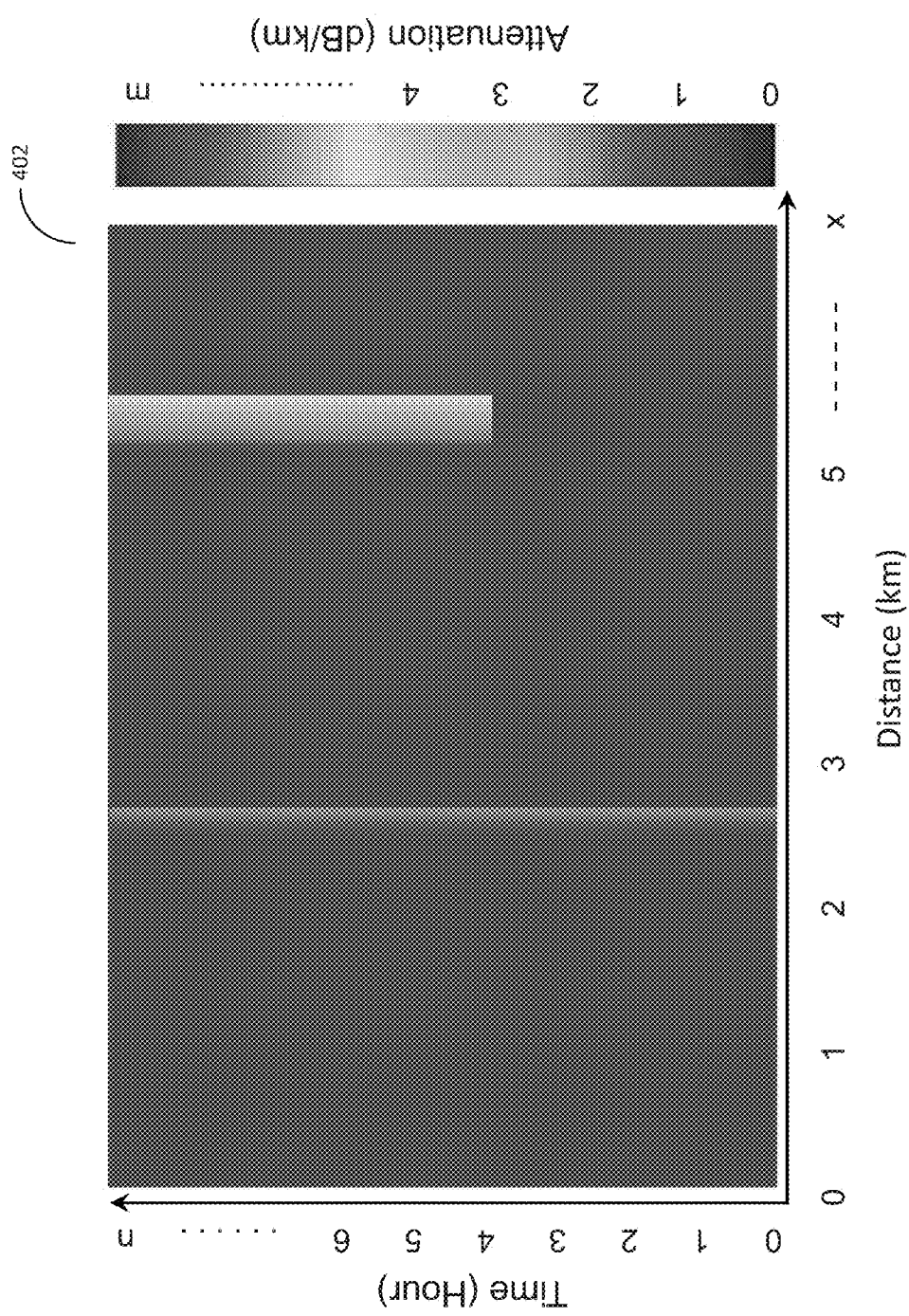
FIG. 4B is an example of a signature image showing an attenuation profile determined by the monitoring system.

At 204, the backscattered light signal can be measured and analyzed for attenuation and dispersion. To do so, in some implementations, the processing circuitry 110 can receive a first set of values and a second set of values representing an attenuation and a dispersion, respectively, of the light signal transmitted through the optical fiber 112. The processing circuitry 110 can generate an attenuation profile and a dispersion profile based on the first set of values and the second set of values, respectively. FIG. 3 is an example of a signature image 300 showing a dispersion profile determined by the monitoring system 104. In some implementations, the dispersion profile is a three-dimensional plot of light signal dispersion including wavelength of the light signal, dispersion and time of measurement on three axes of the three-dimensional plot. FIG. 4A is an example of an attenuation profile 400 experienced by a light signal transmitted through an optical fiber. FIG. 4B is an example of a signature image 402 showing an attenuation profile determined by the monitoring system 104. In some implementations, the attenuation profile is a three-dimensional plot of light signal attenuation including distance from the light source 105, light signal attenuation, and time of measurement on three axes of the three-dimensional plot.

The colors that represent differential change in the dispersion and attenuation profiles are obtained, in part, from a wavelength of light that is transmitted through the optical fiber 112 and wavelengths of light that are included in the backscattered and transmitted light signal. An effect of the instability 114 on the optical fiber 112 is to change the wavelengths of the backscattered light. Consequently, the colors in the dispersion and attenuation profiles generated in the presence of the instability 114 will differ from the colors in the dispersion and attenuation profiles generated during normal operation of the pipeline 100. The processing circuitry 110 can determine the presence or absence of the instability 114 based, in part, on the similarity or difference (and a level of difference) in the colors of the dispersion and attenuation profiles generated in the presence or absence of the instability 114.

At 206, the attenuation and dispersion are correlated to generate a light-based profile signature. In some implementations, the processing circuitry 110 can generate the light-based profile signature describing an environment surrounding the optical fiber using the attenuation profile and the dispersion profile, e.g., by correlating both profiles. For example, when there is a leak of hot gas or fluid in the influence zone, the dispersion profile (i.e., rate of dispersion change) will be higher than the attenuation profile (e.g., rate of signal loss). For pipelines under stress, the attenuation profile would have more impact than dispersion profile. Such correlation can enable identifying the nature and category of system instability source.

At 208, the light-based profile signature describing the environment surrounding the optical fiber 112 can be compared with a baseline light-based profile signature describing an environment surrounding the optical fiber 112 under a normal operating condition. For example, the processing circuitry 110 can generate the baseline light-based profile signature as described above, and compare the baseline light-based profile signature with the light-based profile signature generated at 206. For example, in FIG. 4B, at time, t=4 hr, distance, D=6 km, stress caused high attenuation loss in signal. Similarly, in case of leak of gas or fluid, the dispersion heat map will show more red color which the processing circuitry 110 can capture, compare and analyze.

The processing circuitry 110 can perform a check to determine if the baseline light-based profile signature is the same as or different from the light-based profile signature generated at 206. If the processing circuitry 110 determines that a difference between the baseline light-based profile signature and the light-based profile signature generated at 206 is not statistically significant, then the processing circuitry 110 can determine that the baseline light-based profile signature is the same as the light-based profile signature generated at 206. In response, at 210, the light-based profile signature generated at 206 and the comparison with the baseline light-based profile signature can be documented and archived, e.g., by the processing circuitry 110. The measured light signal and associated attributes can be represented as heat maps. The histograms of each row and column for the measured values (e.g., attenuation, dispersion, PMD, DGD, CD, and/or other measured values) can provide visual presentation for heat map changes over time. Computing and statistical analysis tools and algorithms (e.g., MathWorks, MatLab, SSPS, or other tools) can be used to compare between different heat maps taking into account the rate of changes over time. Comparison algorithms can be customized to build baseline heat map/signature and the different signatures for various pipeline conditions.

If the processing circuitry 110 determines that the difference between the baseline light-based profile signature and the light-based profile signature generated at 206 is statistically significant, then the processing circuitry 110 can determine that the baseline light-based profile signature is different from the light-based profile signature generated at 206. In response, at 212, the temperature and stress surrounding the optical fiber 112 can be manipulated and derived. For example, as described above, the processing circuitry 110 can measure the location of the instability 114 from stress points along the optical fiber 112 through the polarization sensitive optical time-domain reflectometry (p-OTDR) using the speed of light and the time taken to receive the light signal. The processing circuitry 110 can alternatively or in addition determine a temperature or a stress (e.g., pressure, force, or other stress parameter) at the location of the instability 114.

At 214, an alert can be provided and the issue of the instability can be escalated. For example, the processing circuitry 110 can provide a notification indicating the instability 114 to an operator of the pipeline 100. At 216, the issue can be documented and archived. For example, the processing circuitry 110 can store parameters associated with the instability 114 (e.g., a location, a temperature, a stress, a time of occurrence, or other details associated with the instability 114).

At 218, a check can be performed to determine if the instability has been resolved. In some implementations, the processing circuitry 110 can check to receive an input from the operator of the pipeline 100 indicating whether or not the instability 114 has been rectified. Alternatively, or in addition, the processing circuitry 110 can generate a light-based profile signature at a threshold time after issuing the alert (at 214), and compare the generated light-based profile signature with the baseline light-based profile signature to determine if the instability has been resolved. In some implementations, the processing circuitry 114 can determine whether parameters at the location of the instability 114 have returned to within a normal range of parameters during normal operation. If the processing circuitry 110 determines that the instability has been resolved, then the processing circuitry 110 can resume correlating attenuation and dispersion to generate the light-based profile at 206. If the processing circuitry 110 determines that the instability has not been resolved, then the processing circuitry 110 can continue manipulating and deriving temperature and stress surrounding the optical fiber at 212, and repeating the operations at 214 and 216 until the instability has been resolved.

The monitoring system 104, which includes the processing circuitry 110, can be implemented to perform process 200 continuously. By doing so, the monitoring system 104 can generate, in real-time, a light-based profile signature indicating an operational state of the pipeline 100. Real-time generation means that a time at which the optical fiber 112 senses parameters of and surrounding a location of the pipeline 100 and a time at which the processing circuitry 110 generates the light-based profile signature based on the sensed parameters is as small as permitted by the processing circuitry 100. In some implementations, the monitoring system 104 can replace previously generated baseline light-based profile signatures with currently generated light-based profile signatures which have been generated under normal operating conditions.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for monitoring a pipeline, the method comprising:
    receiving, by processing circuitry, a first set of values and a second set of values, the first set of values representing an attenuation of a light signal transmitted through an optical fiber positioned adjacent a pipeline to carry fluids, the second set of values representing a dispersion of the light signal transmitted through the optical fiber;
    generating, by the processing circuitry, an attenuation profile of the light signal through the optical fiber based on the first set of values, and a dispersion profile of the light signal through the optical fiber based on the second set of values, wherein generating the attenuation profile of the light signal comprises generating a three-dimensional plot of light signal attenuation, the three-dimensional plot including distance from a source of the light signal, light signal attenuation, and time of measurement on three axes of the three-dimensional plot, and wherein generating the dispersion profile of the light signal comprises generating a three-dimensional plot of light signal dispersion, the three-dimensional plot including wavelength of the light signal, dispersion, and time of measurement on three axes of the three-dimensional plot;
    generating, by the processing circuitry and using the attenuation profile and the dispersion profile, a light-based profile signature describing an environment surrounding the optical fiber;
    comparing, by the processing circuitry, the light-based profile signature describing the environment surrounding the optical fiber with a baseline light-based profile signature describing an environment surrounding the optical fiber under a normal operating condition; and
    providing, by the processing circuitry, a notification describing an operation of the pipeline in response to comparing the light-based profile signature and the baseline light-based profile signature.

2. The method of claim 1, wherein the attenuation profile and the dispersion profile are affected, in part, by an environment surrounding the optical fiber at a time of receiving the first set of values and the second set of values, respectively.

3. The method of claim 1, further comprising determining that the light-based profile signature substantially matches the baseline light-based profile signature, and wherein the notification identifies the operation of the pipeline as being normal.

4. The method of claim 1, further comprising determining that the light-based profile signature substantially differs from the baseline light-based profile signature, and wherein the notification identifies a failure in the operation of the pipeline.

5. The method of claim 4, further comprising determining a location of failure on the pipeline based on comparing the light-based profile signature and the baseline light-based profile signature.

6. The method of claim 1, wherein generating a light-based profile signature describing an environment surrounding the optical fiber using the attenuation profile and the dispersion profile comprises correlating the attenuation profile and the dispersion profile.

7. The method of claim 1, wherein the light-based profile signature represents at least one of temperature or stress surrounding the optical fiber at a time of generation, and wherein the baseline light-based profile signature represents at least one of temperature or stress surrounding the optical fiber during normal pipeline operation.

8. The method of claim 1, further comprising:
    operating a light source to transmit the light signal through the optical fiber;
    receiving backscattered light in response to transmitting the light signal; and
    measuring the first set of values representing the attenuation of the light signal and the second set of values representing the dispersion of the light signal based, in part, on the backscattered light.

9. The method of claim 1, further comprising storing at least one of the attenuation profile, the dispersion profile, or the light-based profile signature.

10. The method of claim 1, further comprising generating the baseline light-based profile signature during a normal operation of the pipeline.

11. A system for monitoring a pipeline, the system comprising:
    a light source to transmit a light signal through an optical fiber positioned adjacent a pipeline to carry fluids;
    a receiver to receive backscattered light in response to transmitting the light signal; and
    processing circuitry connected to the light source and the receiver, the processing circuitry to perform operations comprising:
        determining a first set of values and a second set of values based on the backscattered light, the first set of values representing an attenuation of a light signal transmitted through the optical fiber, the second set of values representing a dispersion of the light signal transmitted through the optical fiber;
        generating an attenuation profile of the light signal through the optical fiber based on the first set of values, and a dispersion profile of the light signal through the optical fiber based on the second set of values, wherein generating the attenuation profile of the light signal comprises generating a three-dimensional plot of light signal attenuation, the three-dimensional plot including distance from a source of the light signal, light signal attenuation, and time of measurement on three axes of the three-dimensional plot, and wherein generating the dispersion profile of the light signal comprises generating a three-dimensional plot of light signal dispersion, the three-dimensional plot including wavelength of the light signal, dispersion, and time of measurement on three axes of the three-dimensional plot;
        generating, using the attenuation profile and the dispersion profile, a light-based profile signature describing an environment surrounding the optical fiber;
        comparing the light-based profile signature describing the environment surrounding the optical fiber with a baseline light-based profile signature describing an environment surrounding the optical fiber under a normal operating condition; and providing a notification describing an operation of the pipeline in response to comparing the light-based profile signature and the baseline light-based profile signature.

12. The system of claim 11, further comprising a computer-readable storage medium to store at least one of the attenuation profile, the dispersion profile, or the light-based profile signature.

13. The system of claim 11, wherein the computer-readable storage medium is configured to store the baseline light-based profile signature.

14. The system of claim 11, wherein the attenuation profile and the dispersion profile are affected, in part, by an environment surrounding the optical fiber at a time of receiving the first set of values and the second set of values, respectively.

15. The system of claim 11, the operations further comprising:

determining that the light-based profile signature substantially differs from the baseline light-based profile signature, and wherein the notification identifies a failure in the operation of the pipeline; and determining a location of failure on the pipeline based on comparing the light-based profile signature and the baseline light-based profile signature.

16. A system for monitoring a pipeline, the system comprising:

a light source to transmit a light signal through an optical fiber positioned adjacent a pipeline to carry fluids;

a receiver to receive backscattered light in response to transmitting the light signal; and processing circuitry connected to the light source and the receiver, the processing circuitry to perform operations comprising:

generating an attenuation profile of the light signal through the optical fiber and a dispersion profile of the light signal through the optical fiber based, in part, on the backscattered light, wherein generating the attenuation profile of the light signal comprises generating a three-dimensional plot of light signal attenuation, the three-dimensional plot including distance from a source of the light signal, light signal attenuation, and time of measurement on three axes of the three-dimensional plot, and wherein generating the dispersion profile of the light signal comprises generating a three-dimensional plot of light signal dispersion, the three-dimensional plot including wavelength of the light signal, dispersion, and time of measurement on three axes of the three-dimensional plot;

comparing a light-based profile signature describing the environment surrounding the optical fiber, the light-based profile signature generated based, in part, on the attenuation profile and the dispersion profile, with a baseline light-based profile signature describing an environment surrounding the optical fiber under a normal operating condition; and providing a notification describing an operation of the pipeline in response to comparing the light-based profile signature and the baseline light-based profile signature.

17. The system of claim 16, wherein providing the notification comprises providing a notification of a change in an environmental condition surrounding the optical fiber, the environmental condition including at least one of a temperature or a stress.

18. The system of claim 17, the operations further comprising determining a location of the change in the environmental condition surrounding the optical fiber using the attenuation profile and the dispersion profile.

* * * * *